Patented Nov. 15, 1938

2,137,168

UNITED STATES PATENT OFFICE 2,137,168

PRODUCTION OF SELF-SUSTAINING TRANSPARENT FILMS

Harold Alvin Levey, New Orleans, La.

No Drawing. Application May 20, 1936, Serial No. 80,919

19 Claims. (Cl. 91—68)

The present invention relates to a composite self-sustaining film of a high degree of transparency made from a water-soluble carbohydrate, and, preferably, carrying on one or both sides of the film a waterproofing coating. In one form of the invention, only one side of the film carries a waterproofing coating and the other side is inherently adhesive and is adapted to easily bond itself to most surfaces, except those which are waxy, greasy or oily.

Any of the water-soluble carbohydrates from the starches down through most of the sugars may be used, such "amylin", dextrines, and starch gums, the saccharides, water-soluble carbohydrate gums, such as acacia or the like, pentoses, ethers and esters thereof, and many polyhydric alcohols of relatively high molecular weight.

In the more specific aspect of the invention, the self-sustaining film is a starch derivative, or stated differently, a starch base, as for example, starch hydrate, hydrolyzed starch, dextrinized starch, water-soluble starch esters and water-soluble starch ethers. Starch acetate, starch nitrate and starch xanthate, are examples of water soluble starch esters.

It has heretofore been proposed to make self-sustaining starch films, as pointed out in my prior Patent No. 2,012,344, granted August 27, 1935. Broadly, the methods therein set forth may be utilized for the preparation of the present films.

In accordance with the present invention, the transparency and/or clarity and/ flexibility of the water soluble carbohydrate, and especially starch films, is greatly improved, and its tendency to disintegrate and/or decay is greatly inhibited and reduced to a minimum.

The present invention will be illustrated by the preparation of a starch film, but it is to be understood that the procedure herein set forth is applicable to the treatment of all soluble carbohydrates which will form self-sustaining fairly transparent films from a solution, preferably an aqueous solution.

Any of the available starches may be used for preparing the film, although preference is given to the root starches rather than to the cereal starches. Examples of suitable starches are those derived from corn, potato, arrow-root, rice, cassava, or the like. The use of cassava starch is highly desirable, as this produces the toughest and strongest self-sustaining films.

Utilizing cassava starch, the latter is mixed with about six (6) to ten (10) times its weight of water, to which may be added an alkali which will assist in bursting the granules of starch to produce a gelatinous mass. Any alkali may be used as a treating agent, but it is preferred to use caustic soda. The amount of caustic soda used will vary in accordance with the desired adhesiveness of the final starch hydrate film, and it generally may be stated that the caustic soda may be added in an amount equal to one-half (½) of one per cent (1%) to four per cent (4%), based on the weight of the dry starch.

Broadly, in accordance with the present invention, the starch, such as cassava starch, is treated so as to cause the granules of starch to swell and disintegrate, and produce a gelatinous mass, which clarifies into a more or less transparent stringy mass. Therefore, any agent may be used which performs the above function. Instead of using caustic soda, potassium hydroxide, ammonium hydroxide, lithium hydroxide and similar compounds may be used.

Instead of using alkalies, the amines, such as di-methyl amine and related homologs of this series may be used. Instead of using caustic alkalies, other alkalies may be used, such as sodium carbonate. Basic salts and readily hydrolyzable salts of weak acids may also be used. Generally stated, the starch solution or any water-soluble carbohydrate may be mixed with water, or any material which will perform the same function as water, and a small amount of acid, base, salt, catalyst, enzymatic substance, or any material which will break down the starch or water-soluble carbohydrate material into a more or less transparent mass.

The amount of alkali or equivalent agents used will determine the adhesiveness of the starch hydrate film. Using alkalies other than caustic soda, or other treatment agents, so much thereof will be added which will produce a pH or alkalinity in the cooking operation equivalent to that produced by the caustic soda in the amount specified.

The starch mass which has been treated with the alkali is heated, preferably, in a water jacket with continued stirring to about 160° F. This is the preferred temperature in the case of cassava starch. For other starches, the temperatures will be different.

The time that the starch is treated with the disintegrating agent will, of course, vary with the character of the starch and the character of the disintegrating agent. An additional factor influencing the time of treatment is the size and shape of the treatment container. In the above specific example, the cooking of the cassava starch is carried out in a one gallon cylindrical vessel, whose diameter and height are preferably the same. The time of cooking is about twenty (20) minutes to one-half hour, after the starch reaches the temperature of about 165° F. This temperature, is, preferably, although not necessarily, maintained approximately constant during the cooking operation.

The excess alkali present in the starch solution is preferably neutralized with any suitable neutralizing agent, but preferably with phosphoric acid, using phenol phthalein as an indicator.

Nearly all of the inorganic acids and organic acids are the chemical equivalents of phosphoric acid as a neutralizing agent, except those acids which have an oxidizing effect, such as nitric acid, chloric acid, per chloric acid, chromic acid, and similar compounds. Phosphoric acid is preferred, since it appears to produce a plastic with better flowing properties. However, in view of the fact that only a few per cent of the neutralizing agent is necessary, sulphuric, hydrochloric, acetic and oxalic acids may well be used.

A film produced from the above mass is inherently adhesive because the starch has been cooked under alkaline conditions. In other words, an alkaline cook produces an adhesive film, the adhesive qualities of which vary within limits in accordance with the amount of alkali produced.

Under some conditions, it may be desirable to produce a film which does not possess an adhesive surface to produce a starch hydrate film or a water soluble carbohydrate film which does not have an adhesive surface, and in order to do so it is merely necessary to cook the starch under neutral or non-alkaline condition, that is, maintain a pH as near 7 as possible. In all events, it is important to avoid an alkali cook when it is desired to produce a film with a non-adhesive surface.

Those films which have little or no adhesive properties may have the adhesive properties intensified by incorporating in the film an adhesive agent. Any agent which will mix well with a starch hydrate solution and become an integral soluble part thereof may be incorporated in any suitable manner in the starch mass. Similarly, any water-soluble carbohydrate which is not inherently adhesive, may have its adhesive qualities increased by adding thereto an adhesive increasing agent. Examples of suitable adhesives are dextrine carbohydrate gums, such as arabic, tragacanth, karaya, gum ghatti, irish moss, quince seed, and locust bean, as well as glue, gelatin, casein, alginic compounds, including alginates, and blood and egg albumen.

Where it is desirable to increase the adhesive qualities of the starch hydrate film, the adhesive ingredient may be added in various amounts, generally in amounts around ten per cent (10%). Broadly, however, it may be stated that the adhesive increasing agent may be introduced into the plastic mass in amounts varying from ten per cent (10%) to ninety per cent (90%) of the ultimate weight of the film. When the protein products, such as gelatin, casein, albumen and the like are introduced into the starch hydrate film, the amount should not exceed approximately about fifteen per cent (15%) based on the dry weight of the starch, since around this percentage the transparency of the resulting film is substantially reduced, and borders on translucency. Any amount below fifteen per cent (15%) of the protein adhesive increasing agents may be introduced into the mass.

To the plastic solution either with or without the adhesive-increasing agent, there is added a suitable plasticizing agent in amounts equivalent to fifteen per cent (15%) to forty per cent (40%) of the weight of the dry starch. The plasticizing agent may be a glycerol or a glycol, as for example, ethylene glycol, propylene glycol, di-ethylene glycol and similar polyhydric alcohols, as well as the various sugars including the mono-, di- and tri-sacchroses, the pentoses and pentosan gums.

Practically all of the carbohydrates have a definite plasticizing value for the starch film. If the carbohydrate is substantially hygroscopic, its effectiveness as a plasticizing agent is correspondingly greater than those carbohydrates which are less hygroscopic.

As illustrative of the mono-sacchroses, reference is made to glucose and fructose.

As representatives of the di-sacchroses, reference is made to sucrose and maltose.

As representatives of the tri-sacchroses, reference is made to mellitose and raffinose.

Zylose and arabonose are representatives of the pentoses, and mannan and araben are representative of the pentosan gums.

In addition, various natural gums above referred to, and which contain substantial amounts of the pentosan gums are very well suited for this work. These natural gums are gum tragacanth, arabic, karaya, and the like.

In the preferred form of the invention, it is desirable to add to the plastic solution a preservative medium to inhibit organic disintegration and decay of the starch film. Any material may be used, either organic or inorganic, which will so function. Examples thereof are borax, sodium benzoate, sodium salicylate, sodium orthophenyl-phenate, beta-naphthol and the like. These compounds are set forth by way of example, and not limitation. The amount of preservative added will depend on a number of factors including the character of the starch and the kind of preservative agent used. However, when using borax in an amount equal to four per cent (4%) of the weight of the dry starch gives satisfactory results. When using sodium-orthophenyl-phenate, it is desirable to add one-thirtieth (1/30) of one percent (1%) based on the weight of the dry starch.

Any preservative which will inhibit the decay of organic matter, retard the growth of mold, fungi, bacteria and protozoa will maintain the utility and value of the starch film. Most all of the inorganic salts possess varying degrees of effectiveness in this role, and most of the aromatic organic compounds may be introduced into the starch hydrate mass as a water solution, or if these or any other compounds are not soluble in water, soluble derivatives may be formed and these introduced into the mass. For example, the aromatic hydrocarbons and their derivatives may be sulphonated, or some other treatment effected to bring the insoluble compound into the soluble form. Further, the insoluble compounds may be introduced in the form of an emulsion. Additional examples of the preservatives are the water soluble inorganic salts of such metals as copper, arsenic, mercury, thalium, antimony, and the like. Other effective organic agents inhibiting decay are substantially all of the aromatic alcohols and all of the turpene alcohols, of which cresol, resorcinol, thymol, are representative, and are mentioned merely as representative of the aromatic alcohols; and pineol and borneol, which are representative of the turpene alcohols and are mentioned merely as representative of the turpene alcohols.

In general, it may be stated that the amount of preservative agent will vary in accordance with the toxicity of the preservative agent, and somewhat in accordance with the character of the material treated, that is, whether the basic material is starch, a starch nitrate, a starch acetate or some other water soluble carbohydrate. In the case of highly toxic materials, amounts varying from about one-thirtieth (1/30) to one-fifth (1/5) of one per cent (1%) based on the weight of the dry film, will inhibit decay, while for the less active agents, such as borax, more will be necessary, and as much as up to four per cent (4%) may be desirable to inhibit decay in a warm humid atmosphere.

It has been discovered that transparency and clarity of the film, and particularly starch films, may be substantially improved by the addition of a clarifying agent to the plastic mass. Suitable clarifying agents are the amino compounds. In general, it may be stated that the substituted ammonias, and their addition products, are suitable. Included in this generic term are the amines, amides, imides, anilines, anilides, the cyclic nitrogen compounds, such as pyridine, quinoline, acridine and the like, as well as the hydrazines, hydroxyl amines and the oximes.

It may be stated that the more alkaline the amine, the less the amount required. However, there appears to be other aspects to the clarifying of the plastic than the alkalinity alone. Experiments indicate that the amines have the capacity of digesting and dispersing the shells of the starch granules which appear to be a form of hemi-cellulose, and thereby eliminate the slight cloudiness which results from their presence. Alkalinity alone does not produce this result.

The amount of clarifying agent added depends on the character of the starch and the particular amino compound used. Using the amines, satisfactory results are obtained by adding from one per cent (1%) to ten per cent (10%) of the weight of the dry starch. When using tetra substituted amines (such as tetrone B) and treating cassava starch, one per cent (1%) of this quaternary substituted amine, based on the weight of the dry starch, is used.

When using tri-ethanol amine and treating cassava starch, ten per cent (10%) of this amine, based on the weight of the starch is used.

Amino derivatives, such as the acet-amines, as for example, acet-amide, acet-anilide, and the like, as well as the alcohol amines, such as mono-, di- and tri-ethanol-amine. The ethanol amines have the dual function of both clarifying and plasticizing the dried film and may replace some of the glycerol above referred to as a suitable plasticizer for the starch film.

Tetrone B marketed by Rohm and Haas of Philadelphia is a quaternary or tetra substituted ammonium with alkyl groups and with a molecular weight of approximately 170. This product is so active in its solvent power that it dissolves cellulose present in the starch, and as a result it is only necessary to add about one per cent (1%) to obtain the desired result. On the other hand, less active amino compounds must be added in greater quantities, for example, if succinamide is used, it should be added in an amount equal to about ten per cent (10%), based on the weight of the dry starch.

The starch film may be produced as above set forth and preferably includes an adhesive increasing agent, a plasticizing agent, a preservative agent and a clarifying agent. In some cases, any or all of these various agents may be omitted, but in order to produce a high class commercial article, it is preferred to proceed to improve the quality of the film by the treatment above set forth.

The starch plastic, including any or all of the above additive agents, is spread into film form. This may be done by providing a clean polished surface of metal, such as nickel, stainless steels, aluminum and the like or non-metallic surfaces, such as polished Bakelite, glass, rubber and equivalent surfaces.

Any smooth polished surfaces of the character above set forth may be coated with a thin film of wax, such as carnauba wax, candelia, paraffin, and the like, or instead of using wax, oils may be used, such as cotton seed oil, corn oil, oleo stearene, etc. The starch plastic is extruded or poured on this surface and gauged down to the desired thickness by a doctor blade or scraper which moves over strips of such thickness as will produce an ultimately dried film of the desired dimensions. The dried film may range in thickness from about 0.0005 to 0.008 depending on whether it is used as a wrapping or packaging sheet, or whether it is used as an adhesive material, as hereinafter more fully pointed out.

The carrier surface and the thin film starch is dried in an oven at about 160° to 185° for about ten (10) minutes. If lower temperatures are used for drying, the drying period is correspondingly longer. The temperature of drying may vary greatly, so long as the temperature is not sufficient to burn or damage the film.

It may be stated that the time of drying varies with the thickness of the film, the temperature and the relative humidity of the drying air, the velocity with which the air passes over the drying sheet, the amount of water evaporated from the sheet, and the tendency of the starch hydrate film to oxide or skin over. The time of drying may vary from two and three-fourths (2¾) minutes to more than an hour. The optimum conditions for a film of one-thousandth (1/1000) of an inch thick are a moisture content of eighty per cent (80%), a temperature of about 185° F. dry bulb, and 135° F. wet bulb, and an air velocity of about 300 linear feet per minute. These conditions will prevent skinning over of a normal starch cook.

The film, after drying, is stripped from the spreading surface when the moisture content has been reduced sufficiently to produce a fairly dry film. As an example, it has been found that the film is satisfactorily dried when it has had its moisture content reduced so that the moisture content varies from twelve (12) to twenty (20) per cent of the weight of the dried starch composition film.

The removal of the film from the carrier surface is effected by picking the film from the spreading carrier surface, and then winding the film upon a roll of from about one-quarter (¼) of an inch to several inches in diameter, depending upon the type of device used and the rate of removal.

The film should be promptly unwound where short spreading is made, and if the operation is continuous, the film should pass only partly around the roll onto the other equipment for the subsequent operations.

The film produced as above set forth may have one or both of its surfaces coated to render either both surfaces of the film waterproof, or only one surface waterproof, leaving the other surface uncoated so as to take advantage of the adhesive character of the surface and adapt the film to such uses as hereinafter set forth.

It is within the province of the present invention to coat the film in any manner, including the method set forth in my prior Patent No. 2,012,344.

When coating only one face of the film, the coated composition may be applied prior to removal of the starch film from its carrier surface, and the application may be by means of a spray gun, by a brush, or the composition may be flowed on or printed on the surface by means of a suitable printing roll.

The waterproofed coating composition may be applied to the carrier surface and the composition dried to remove the volatile solvents. The starch plastic is then spread over this surface, drying the starch film as above described. Thereafter, the starch film carrying the waterproofing coating which is in effect a lamination sheet comprising the starch film and the waterproofing film thereon may be lifted from the carrier surface. The material may then be wound upon rolls, which are trimmed to the desired width by means of suitable cutting knives already in use for this general type of production. These rolls may then be cut into smaller widths while coiled or the rolls may be unwound and passed between slitting wheels or slitting knives and subsequently wound in coils to provide an adhesive tape of the desired width and diameter. The film may be supplied in large stock-size sheets of standard dimensions, or in suitable smaller cut-to-size dimensions. In stacking these sheets, which have only one side coated or waterproofed and the other side of an adhesive character, it is obviously necessary to avoid two starch surfaces coming in contact with each other, as the adhesive nature of this material will prevent subsequent separation without destruction of the composite film.

The waterproofing composition itself may be any of the materials set forth in my prior patent. However, in general the waterproofing lamination may consist of a coating resulting from applying to the starch film solutions of the cellulose esters, of which the cellulose acetates, the nitrates and benzoates are typical examples; cellulose ethers in general, of which cellulose methyl ethyl, and benzyl ethers are examples; solutions of natural resins such as dammars, kauris, copals and the like; synthetic resins in general of which the phenol aldehydes, the glyceryl phthalates, the cumars, the vinyl esters and the like are examples. The waterproofing coating may be derived from rubber solutions made from chlorinated rubbers, rubber hydrochloride, synthetic rubber solutions, such as thiokol.

Thiokol is prepared by the polymerization of chlorinated olefins with polysulfides. In the preferred form ethylene di-chloride is heated at around its boiling point with sodium polysulfide (Na$_2$S$_4$), in which it is used in the proportion of about two and one-half (2½) times the amount of ethylene di-chloride. The reaction is completed in about six (6) hours.

The combusion analysis of thiokol is

| | Per cent |
|---|---|
| Carbon | 15 |
| Hydrogen | 2.5 |
| Sulphur | 82 |

One surface of the starch film may be rendered waterproof and non-adhesive by coating the same with a thin film derived from natural and synthetic waxes which may be applied from either a solution of the same, or by application in the molten state of the wax. These coating compositions are plasticized with suitable softening agents to make the resulting waterproofing film on the starch sufficiently flexible and plastic so that the final starch film carrying the waterproofing composition may be used for any of the herein described purposes.

It is desired to point out that one of the features of the present invention is the provision of a self-sustaining starch film made of a starch or a starch derivative, one surface of the film having a waterproofed protective coating, and the other surface being characterized by adhesive qualities enabling the film to be used for any purpose where this adhesive character may be taken advantage of.

The following are representatives of suitable waterproofing compositions:

| | Per cent |
|---|---|
| 1. Cellulose nitrate | 15 |
| Ethyl acetate | 40 |
| Dibutyl phthalate | 5 |
| Butyl acetate | 20 |
| Benzol | 12 |
| Methanol | 8 |

2. In the above composition, the cellulose nitrate may be substituted by a cellulose ether, including those specifically hereinbefore mentioned.

| | Per cent |
|---|---|
| 3. Natural resins | 25 |
| Butyl acetate | 40 |
| Acetone | 15 |
| Benzol | 12 |
| Methanol | 8 |

The solvent mixture of the above set forth composition may be modified to meet the requirements of the various types of natural resins in order to produce a clear transparent film. It will also serve for most of the synthetic resins.

| | Per cent |
|---|---|
| 4. Rubber solutions (solids) | 10 |
| Ethylene dichloride | 90 |

Other solvents such as carbon bi-sulphide, acetone, solvent naphtha, etc. may be used in place of the above depending upon the particular form of rubber used in formulating the coating composition.

| | Per cent |
|---|---|
| 5. Waxes | 6–10 |
| Solvents | 94–90 |

The solvents or solvent mixtures will depend upon the particular wax used. For paraffin, solvent naphtha may be used; for halowaxes or chlorinated naphthalenes, ethylene dichloride may be used; for true waxes such as spermaceti, carnauba and the like varying mixtures of acetone, ethyl acetate and the like may be used.

It may be stated, in general, that the preferred waterproofing composition consists of those compositions containing nitrocelluloses such as cellulose nitrate. Of course, the composition is dissolved in a suitable solvent and a nominal amount of plasticizer is added. It may be desirable, in some cases, to add a small amount of wax-like substances to improve the waterproofness of the dried coating. For example, the base of the waterproofing composition may be cellulose nitrate together with a small proportion of wax or natural resins together with a small proportion of wax or rubber solution, together with a small proportion of wax. The use of the waxes while quite desirable in the nitro-cellulose-containing compositions is not quite so desirable in other waterproofing compositions. It is desired to point out that in one form of the present invention, it is desirable to use the same plasticizer for the starch film as is used for the waterproofing composition. For example, di-ethylene glycol may be used to plasticize the starch film and the nitro-cellulose coating composition. It may be stated that when both the starch film and the coating composition contain the same plasticizing agent, that this plasticizing agent which is common to each lamination of the film tends to improve the bond between the two dissimilar laminations. Instead of using di-ethylene glycol as a plasticizer for both the starch film and the coating composition, ethylene-glycol-mono-methyl-ether may be used.

While it has been stated that a common plasticizer may be used in a starch film lamination and in the waterproofing lamination, it is within the province of the present invention to use different plasticizers in these two laminations and use a separate bonding agent between the starch film lamination and the waterproofing lamination and di-ethylene glycol and ethylene-glycol-mono-methyl-ether may be used as bonding agents.

If plasticizers are already present in the starch film composition and in the waterproofing composition, then about 10% of the above compounds, based on the weight of the starch film, may be used to improve the bonding of the two laminations.

On the other hand, if the above substances or their substantial equivalents are to be used in the starch film as a plasticizer and a bonding agent, then it is preferred to have present in the starch film an amount equal to about thirty per cent (30%) of the weight of the starch.

As previously pointed out, the present invention contemplates the provision of a self-sustaining starch film which has been impregnated with or coated with a waterproofing material so as to coat one or both sides of the starch film. If both sides of the starch film are coated, then, of course, it is not necessary to prepare the starch film so that it has adhesive qualities. However, if only one face of the starch film is coated, then it is necessary to proceed as herein set forth to digest the starch with sufficient alkali to produce a starch film which has inherent adhesive properties. Of course, if the film is to be coated on both sides, then it is not necessary to incorporate any adhesive-increasing agent.

If the starch film is not inherently adhesive, it may still be coated on only one side and used for many purposes.

In general, it may be stated that the starch film if made from a non-adhesive starch composition and coated on one or both sides, but preferably on both sides, may be used as a transparent waterproof wrapping for many products.

If the film is made from an adhesive starch film and is waterproofed on both sides so as to leave no free adhesive surface then the material may also be used in general for wrapping or for any purpose for which it is desirable to provide a transparent substantially waterproof flexible composite sheet.

One of the important products of the present invention is a clear transparent non-decayable starch film which carries a waterproofing coating on one face and is relatively dry on the other face, said dry face becoming adhesive only when moistened. Such a sheet may be used as a mending tape and may be sold in the usual spool form. It may also be used as a protective covering for books, maps, drawings and prints, the adhesive aids of the film being, of course, applied to the objects.

The film may also be applied to colored lithographed and printing matter, and it may be stated that it has been impossible to put a waterproof lacquer coating on such materials because such a material causes the inks to run. This disadvantage is entirely eliminated in accordance with the use of the product herein disclosed.

The hereindescribed laminated sheet is also suitable as a decalcomania or a transfer, as well as for ornamental decorations for glass. It may be used in connection with transparent signs.

Advertising novelties, oil and water paintings and photographs may be protected and covered by this type of sheet.

The herein-disclosed self-sustaining starch film is adapted for use in the pharmaceutical field. The material may be used as an adhesive tape for bandage closures and wound coverings, and also as a medicated tape and as a surgical dressing tissue, said subject matter being claimed in applicant's co-pending application Serial Number 84,563, filed June 10, 1936.

In general, it may be stated that when the self-sustaining starch film carrying a waterproofing coating is used as a wrapping material and is not provided with an adhesive surface, that it should vary in thickness between 0.001 and 0.0001. When the film is provided with an adhesive surface, the thickness, in general, should range from about 0.001 to 0.003, as the case may require. This is the preferred thickness when the material is used for mending purposes.

It may be pointed out that the film of the adhesive surface may be used for bonding and sealing purposes by moistening the potentially adhesive surface or the surface need not be moistened. In this case, the film will act as a bonded and adhesive medium by the simple expedient of applying heat or heat and pressure. In certain cases, when the adhesive surface is moistened, the seal may be made more effective by applying heat and pressure.

It may be stated that in the broad aspect of the present invention, all water soluble carbohydrates may be formed into self-sustaining transparent films, the water-soluble cellulose esters and cellulose ethers may also be used to prepare self-sustaining transparent films and the water-soluble carbohydrates, including the cellulose esters and ethers, may be treated as herein set forth to produce composite waterproof films. In general, it may be stated that the water-soluble carbohydrates are dissolved in a sufficient amount of water to obtain a viscose plastic solution or colloid and extrude the same through a slot or other known type of film-forming device onto a carrier surface upon which it is dried and subsequently removed. In the case of starch, only, it is necessary to cook the same to render the starch water soluble and thereby produce a workable plastic mass from which the films are formed.

It is within the province of the present invention to use mixtures of different starch bases to provide the self-sustaining starch base film. For example, the starch hydrate base may be mixed with starch nitrate to provide a film which has inherent adhesive properties or which does not have any adhesive properties. Similarly, dextrinized starch may be mixed with starch acetate or starch nitrate. Any of these mixtures may be treated in accordance with the present invention as herein disclosed.

What is claimed is:

1. A new article of manufacture consisting of a transparent flexible self-sustaining inherently adhesive starch base film, adapted as a protective covering for a book and the like, one face of said film having adhesive properties, said face being capable of being moistened, and the other face of which carries a waterproofing film.

2. A new article of manufacture consisting of a transparent flexible self-sustaining starch base film possessing substantially no inherent adhesive properties but made adhesive by having incorporated therein an adhesive material.

3. A new article of manufacture consisting of a transparent flexible self-sustaining starch base film possessing substantially no inherent adhesive properties but made adhesive by having incorporated therein an adhesive material, one face only of said film carrying a waterproofing agent, and the other face being adhesive in character.

4. A new article of manufacture consisting of a transparent flexible self-sustaining inherently adhesive starch base film, having present an agent inhibiting organic disintegration said agent being compatible with the starch base film and incapable of substantially reducing the transparency thereof, one face of said film having adhesive properties and the other face carrying a waterproofing film, the latter being bonded to the starch film by a common-non-volatile solvent present in both films and acting as a plasticizer for both films.

5. A new article of manufacture consisting of a transparent flexible self-sustaining starch base film containing a plasticizer and clarified by the presence of a reaction product of the starch with a clarifying agent of the substituted ammonia type capable of digesting and dispersing the starch shells of the starch.

6. A new article of manufacture consisting of a transparent flexible self-sustaining starch base film containing a plasticizer and clarified by the presence of a reaction product of the starch with a clarifying agent of the substituted ammonia type capable of digesting and dispersing the shells of the starch, one face of said film being adhesive in character and the other face of said film carrying a waterproofing film.

7. A new article of manufacture consisting of a transparent flexible self-sustaining carbohydrate film formed of a member of the group consisting of starch derivatives, saccharides, starch gums, carbohydrate gums, pentoses, ethers and esters thereof, one face of which has adhesive properties, and the other face of which carries a waterproofing film.

8. A new article of manufacture consisting of a transparent flexible self-sustaining starch film, one face of which carries a waterproofing film the latter being bonded to the starch film by a common non-volatile solvent present in both films and acting as a plasticizer for both films.

9. A new article of manufacture comprising a transparent flexible self-sustaining inherently adhesive carbohydrate film formed of a member of the group consisting of starch derivatives, saccharides, starch gums, carbohydrate gums, pentoses, ethers and esters thereof, the film having present an agent inhibiting organic disintegration of the film, said agent being compatible with the carbohydrate film and incapable of substantially reducing the transparency of the film, one face of said film having adhesive properties, and the other face carrying a waterproofing film, said films being bonded together by a common non-volatile solvent present in both films and acting as a plasticizer for both films.

10. A new article of manufacture comprising a transparent flexible self-sustaining inherently adhesive starch base film having present an agent inhibiting organic disintegration of the film, said agent being compatible with and incapable of substantially reducing the transparency of the starch base film, one face of said film having adhesive properties, and the other face carrying a water-proofing film, said films being bonded together by a common non-volatile solvent present in both films and acting as a plasticizer for both films.

11. A new article of manufacture comprising a transparent flexible self-sustaining inherently adhesive starch base film clarified by the presence of the reaction product of the starch and a clarifying agent of the substituted ammonia type capable of digesting and dispersing the shells of the starch base, one face of said film having adhesive properties and the other face carrying a waterproof film, said films being bonded together by a common non-volatile solvent present in both films and acting as a plasticizer for both films.

12. A new article of manufacture comprising a transparent flexible self-sustaining inherently adhesive starch base film clarified by the presence of the reaction product of the starch and a clarifying agent selected from the group consisting of amines, amides, imides, anilines, anilides, the cyclic nitrogen compounds including pyridine, quinoline, acridine, hydrazine, the hydroxyl amines and the oximes, and having incorporated therein an agent inhibiting organic disintegration of said starch base film, said agent being compatible with and incapable of substantially reducing the transparency of the starch base film, one face of said film having adhesive properties and the other face carrying a waterproofing film, said films being bonded together by a common non-volative solvent present in both films and acting as a plasticizer for both films.

13. The process of producing a transparent flexible self-sustaining carbohydrate film comprising cooking a water soluble carbohydrate in an alkaline medium adapted to confer adhesive properties upon the resulting plastic and film produced therefrom adding after cooking a plasticizer, and a clarifying agent selected from the group consisting of amines, amides, imides, anilines, anilides, the cyclic nitrogen compounds including pyridine, quinoline, acridine, hydrazine the hydroxyl amines and the oximes, casting the cooked plastic material in the form of a self-sustaining film, and applying to one of the adhesive surfaces of the film a waterproofing agent.

14. The process of producing a transparent flexible self-sustaining starch film comprising cooking the starch material in an alkaline medium to confer adhesive properties upon the starch plastic and film produced therefrom adding after cooking a plasticizer, and a clarifying agent selected from the group consisting of amines, amides, imides, anilines, anilides, the cyclic nitrogen compounds including pyridine, quinoline, acridine, hydrazine, the hydroxyl amines and the oximes, casting the cooked starch plastic in the form of a self-sustaining film, and applying to one of the adhesive surfaces of the film a waterproofing agent.

15. The process of producing a transparent flexible self-sustaining starch film comprising cooking the starch material to a plastic mass in a medium of sufficient alkalinity to confer adhesive properties upon the starch plastic and the film produced therefrom, adding after cooking a plasticizer and a compound of the substituted ammonia class to the plastic to clarify the same, casting the cooked plastic in self-sustaining film form and applying to one of the adhesive surfaces of the film a waterproofing agent.

16. The process of producing a transparent flexible self-sustaining starch film comprising cooking the starch material to a plastic mass in a medium of sufficient alkalinity to confer adhesive properties upon the starch plastic and the film produced therefrom, adding after cooking a plasticizer and about 1% to 10% by weight of the starch of a compound of the substituted ammonia class to the plastic to clarify the same, casting the cooked plastic into self-sustaining film and applying to one of the adhesive surfaces of the film a waterproofing agent.

17. The process of producing a transparent flexible self-sustaining starch film comprising cooking the starch material to a plastic mass in an alkaline medium adapted to confer adhesive properties upon the starch plastic and the film produced therefrom, adding after cooking a compound of the substituted ammonia class to the plastic to clarify the same, said substituted ammonia product also acting as a plasticizer for the starch film, casting the cooked plastic into self-sustaining film, and applying to one of the adhesive surfaces of the film a waterproofing agent.

18. The process of producing a transparent flexible self-sustaining starch film comprising cooking the starch material to a plastic mass in an alkaline medium adapted to confer adhesive properties upon the starch plastic and the film produced therefrom, adding an ethanol amine to clarify and plasticize the starch plastic, casting the cooked plastic into self-sustaining film and applying to one of the adhesive surfaces of the film a waterproofing agent.

19. The process of producing a transparent flexible self-sustaining starch film comprising cooking the starch material having present granules of starch and granular shells in an alkaline medium adapted to confer adhesive properties upon the starch plastic, adding to the plastic after cooking a plasticizer and a substituted ammonia compound having the capacity of digesting and dispersing the shells of the starch granules to thereby eliminate in the plastic and in the final film the slight cloudiness resulting from the presence of said granules, casting the so-treated starch plastic into self-sustaining film and applying to one of the adhesive surfaces of the film a waterproofing agent.

HAROLD ALVIN LEVEY.